W. T. HAUSER.
ANIMAL TRAP.
APPLICATION FILED MAY 27, 1916.

1,199,178.

Patented Sept. 26, 1916.
2 SHEETS—SHEET 1.

Inventor.
W. T. Hauser, by
G. C. Kennedy,
Attorney.

W. T. HAUSER.
ANIMAL TRAP.
APPLICATION FILED MAY 27, 1916.

1,199,178.

Patented Sept. 26, 1916.
2 SHEETS—SHEET 2.

Inventor,
W. T. Hauser, by
G. C. Kennedy,
Attorney.

UNITED STATES PATENT OFFICE.

WALTER THEOBALD HAUSER, OF FREEMAN TOWNSHIP, BUTLER COUNTY, IOWA.

ANIMAL-TRAP.

1,199,178.  Specification of Letters Patent.  Patented Sept. 26, 1916.

Application filed May 27, 1916.  Serial No. 100,185.

*To all whom it may concern:*

Be it known that I, WALTER THEOBALD HAUSER, a citizen of the United States of America, and a resident of Freeman township, Butler county, Iowa, have invented certain new and useful Improvements in Animal-Traps, of which the following is a specification.

Figure 1:
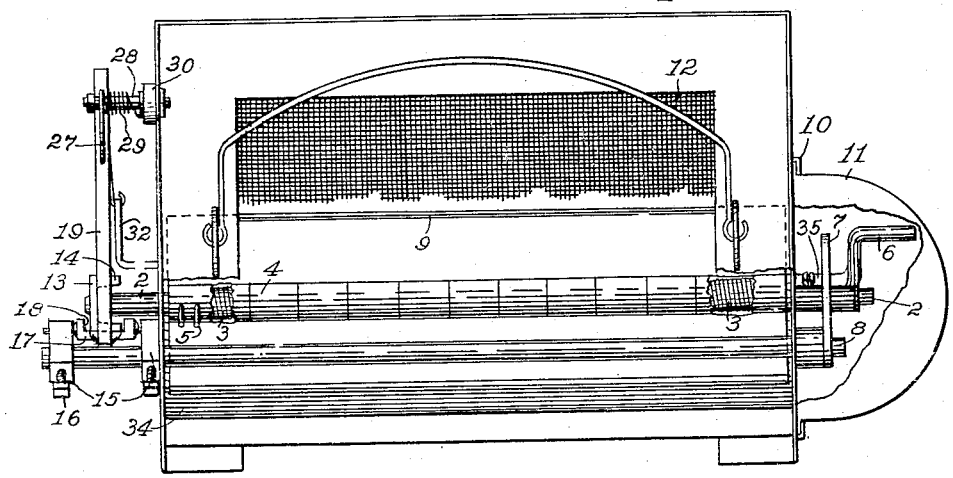
Figure 2:
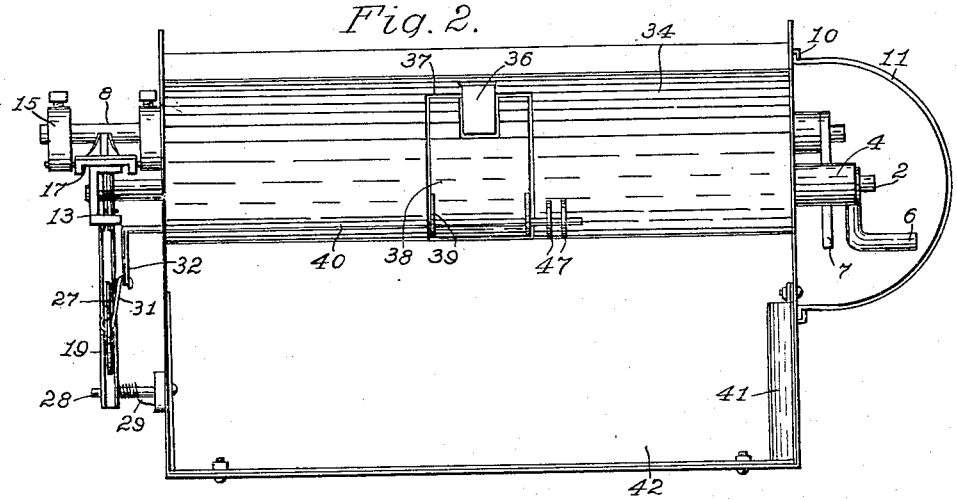
Figure 8:
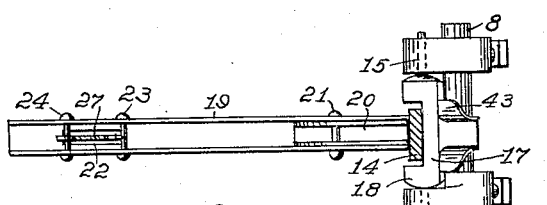
Figure 3:
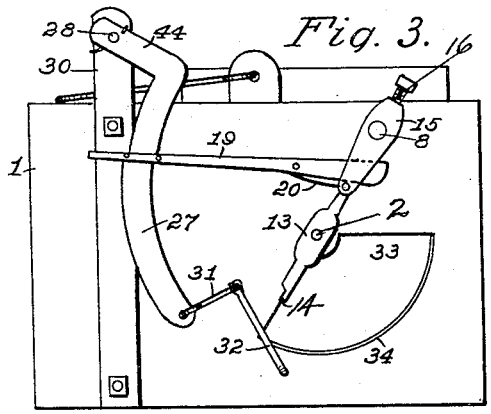
Figure 4:
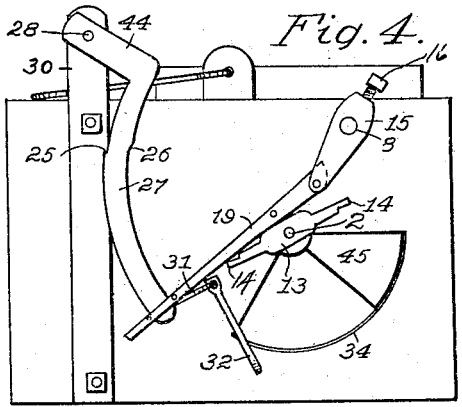
Figure 5:
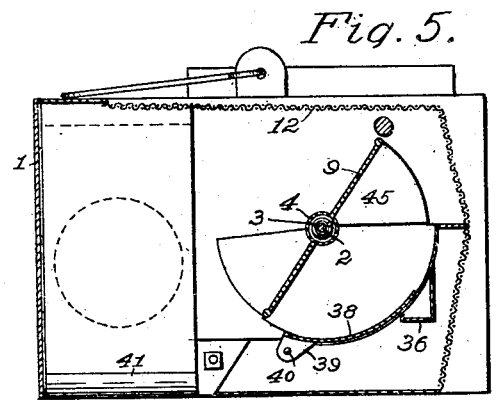
Figure 6:
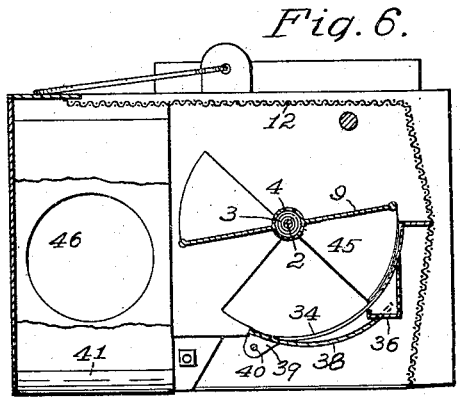
Figure 7:
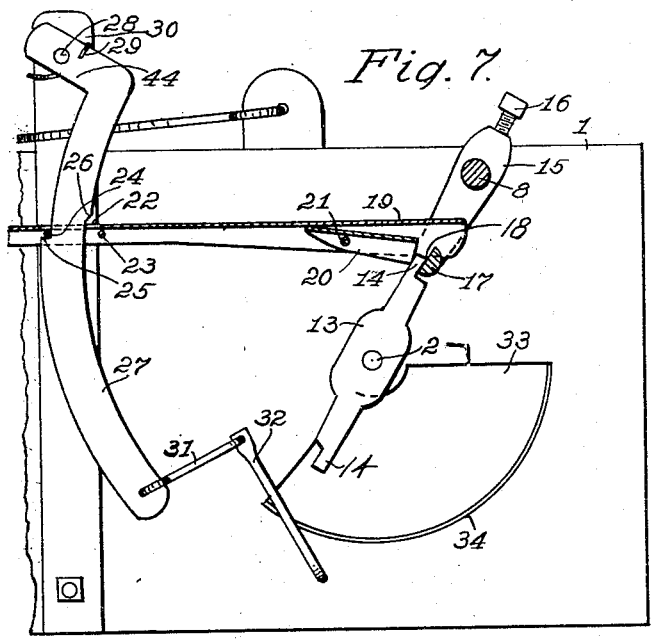
Figure 9:
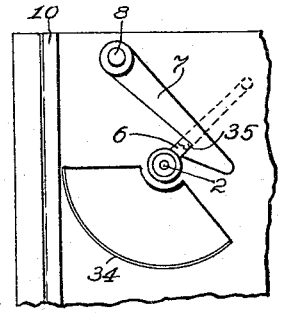

My invention relates to improvements in animal traps, and particularly to devices for catching rats or mice, and the object of my improvement is to furnish a device adapted to receive and quickly propel the animal into an inclosure when placed appropriately for the purpose. This object I have accomplished by the means which are hereinafter described and claimed, and which are illustrated in the accompanying drawings, in which:

Figure 1 is an upper plan view of my improved device, with parts broken away. Fig. 2 is an under plan view of the device. Fig. 3 and Fig. 4 are elevations of one end of the device, showing operative parts thereof respectively as set and released. Figs. 5 and 6 are cross-sections of the device, also showing it with its operative elements set, and as released. Fig. 7 is an enlarged end elevation, like that of Fig. 3, but having parts sectioned away. Fig. 8 is an enlarged detail view of the locking-means for the catch-arm, with parts broken away, and Fig. 9 is a detail view of the crank and pawl for winding and controlling the drive-spring of the device.

Similar numerals of reference denote corresponding parts throughout the several views.

The operative elements of my improved trap are mounted in and on a casing or inclosure 1 of rectangular form, with the top and front covered by wire screen 12. The bottom 42 is raised and has a longitudinally troughed part 34 in front within which the rotary sweep 9 is mounted upon a longitudinal shaft 2, the ends of the latter extending through both ends of the casing. Upon the right-hand end of the shaft 2 is removably secured a squared body 35 by means of a screw, said body having an integral crank-arm 6, and the squared part of the body being positioned to become engaged releasably by a pawl 7 mounted on one end of a fixed shaft 8. A strong coiled spring 3 is mounted upon the shaft 2 within the casing, one end being secured to the left-hand part of the shaft 2, and its other end to the sleeve-part 4 of the sweep 9 which is seated about the spring. By these means, when the crank 6 is rotated in one direction, the spring is wound up, the pawl 7 clicking over the raised crank-shank 35, but preventing a retrograde movement of the shaft 2.

Slideways 10 are provided on the right-hand end of the casing 1 to receive flanges of a semi-cylindrical removable boxing 11, closed at the top and open at the bottom, and which incloses the crank and pawl when in position.

In the middle part of the troughed bottom 34 is provided a rectangular opening 37 to seat a trip-plate 38, the latter having spaced lugs 39 fixed on a longitudinal shaft 40, the right-hand end of the latter mounted in bearing-lugs 47 on the bottom 34, and having its left-hand end extended through a bearing-opening in the left-hand wall of the casing 1 and bent over to provide a crank 32. The forward part of the trip-plate 38 is rectangularly notched to receive a bait-box 36 fixed to the bottom 34, and opening at the top into the interior of said casing.

In the right-hand end wall of the casing, is a circular hole 46, covered by a slide 41, as shown in Fig. 6.

The releasable trip-mechanism is mostly located at the outside of the left-hand of the casing 1, as best shown in Figs. 3, 4 and 7. On the left-hand end of the fixed shaft 8 are secured brackets 15 by means of set-screws 16, having alined bearing-orifices to receive the diminished ends or pintles of a short rock-body 17 cut away medially at 18. A relatively long catch-arm 19 has one end fixedly mounted on the rock-body 17, and is formed with depending longitudinal marginal flanges. A locking-pawl 20 is mounted in the hollow of said arm on a pintle 21, and limited in its drop by reason of its left-hand extension contacting with the under face of the arm.

On the left-hand outer end of the shaft 2 is fixed a cross-bar 13 whose oppositely-directed arms have extremities 14 bent to the right or parallel with the shaft and notched on one side of each for a purpose to be mentioned. As shown in Fig. 7, the notched extremities 14 contact with the cut-out middle part 18 of the rock-body 17, covering about one-half of the width of the latter, and held there by means of the tension of the spring 3, when the latter has been wound up. The left-hand end of the catch-arm 19 has a longitudinal slot 22 through which is passed a curved swing-arm 27, the upper end of the latter being bent to one side at 44 and hung pivotally on a pintle 28 extending from the top of a post 30 secured on the casing 1. A coiled spring 29, seated on said pintle, has one end secured to said post, and its other end fastened to the swing-arm 27 and exercises a tension upon the latter to propel it to the left relative to the catch-arm 19. Cross-rods 24 and 23 connect the depending flanges of said catch-arm on opposite sides of its slot 22. The lower end of the swing-arm 27 is connected to the end of the crank 32 of the trip-shaft 40, by means of a link 31. The arm 27 has on its convex edge an offset angular projection 25, and on its opposite concave edge a sloped projection 26, for purposes to be described.

Operation: The spring 3 having been wound up, one of the arms 14 of the cross-bar 13 will impinge upon the cut-out part 18 of the rock-body 17, thus, as shown in Fig. 7, moving the catch-arm 19 up where its cross-pin 24 will become engaged with the projection 25 on the swing-arm 27, the latter being held in position against said pin by the tension of the spring 29. This swinging of the arm 27 causes a rocking of the crank 32 and shaft 40, to place the trip-plate 38 in its upper or tripping position as shown in Fig. 5. As the catch-arm 19 rises, and the cross-bar arm 14 rocks past, the pawl 20 drops behind the cross-bar arm and locks it against retrograde movement. The trap thus set, the boxing 11 is located with its open lower end over a rat-hole. A rat, mouse or gopher, or the like animal, passes from its hole into the casing 1, and, attracted by bait placed in the box 36, steps on the trip-plate 38, pushing it down to the position shown in Fig. 6. This causes a reverse rocking of the shaft 40, its crank 32, and the swing-arm 27 is moved to the right, releasing the cross-pin 24 from the projection 25, so that the arm 19 drops, rocking the body 17 to permit the cut-out part 18 to become disengaged from and to release the cross-bar arm 14. The latter is then suddenly swung by the strong spring 3, causing the sweep 9 to throw the animal into the inclosure back of it, where it is confined until taken out through the opening 46, after the slide 41 is moved out. The spring 3 causes the rock-body to swing around to a point where the other arm 14 thereof pushes up the catch-arm 19, as shown in Fig. 4, the latter in rocking up also rocking the rock-body 17 to a position where it forms a stop for the arm 14, just at the time that the hither end wall of the slot 22 pushes on the sloping projection of the arm 27 to rock the latter so as to cause the opposite projection 25 to move under the cross-pin 24, where the parts become again set ready for another operation. The sweep moves so quickly that the animal cannot escape being swept into the inclosure, but either of the wings 45 at the ends of the sweep would prevent egress through the open ends of the trough 34.

Having described my invention, what I claim as new, and desire to secure by Letters Patent, is:

1. A trap, comprising an inclosure having an inlet-opening, a rotary sweep mounted in said inclosure, resilient actuating-means connected to and adapted to be wound up to rotate said sweep, a trip-body in that part of said inclosure accessible to the inlet-opening, a swing-arm having engaging-means, a rock-body releasably engaged with the engaging-means on said swing-arm, connections between said trip-body and said swing-arm, and a push-arm connected to said sweep and adapted to be rotated in the path of movement of said rock-body to lock therewith when the rock-body is engaged with the engaging-means on the swing-arm, and to be released therefrom when the trip-body is moved to disengage the swing-arm from the rock-body.

2. A trap, comprising an inclosure having an inlet-opening, a rotary sweep mounted in said inclosure, resilient actuating means connected to and adapted to be wound up to rotate said sweep, means for preventing rotation of the sweep in one direction, a trip-body in that part of said inclosure accessible to said inlet-opening, a swing-arm having engaging-means, a rock-body releasably engaged with the engaging-means on said swing-arm, yieldable resilient means connected to said swing-arm adapted to swing it in one direction to interlock with said rock-body, connections between said trip-body and swing-arm adapted to rock the latter out of engagement with the rock-body when the trip-body is depressed, and a push-arm connected to said sweep to rotate therewith into the path of movement of said rock-body to lock releasably with the rock-body when the latter is engaged with said swing-arm and to be disengaged therefrom when the swing-arm is disengaged from the rock-body.

3. A trap, comprising an inclosure having an inlet-opening, a rotary sweep mounted in said inclosure, resilient actuating means connected to and adapted to be wound up to rotate said sweep, means for preventing rotation of the sweep in one direction, a trip-body in that part of said inclosure accessible to said inlet-opening, a swing-arm having engaging-means, a rock-body releasably engaged with the engaging-means on said swing-arm, yieldable resilient means connected to said swing-arm adapted to swing it in one direction to interlock with said rock-body, connections between said trip-body and swing-arm adapted to rock the latter out of engagement with the rock-body when the trip-body is depressed, and a push-arm connected to said sweep to rotate therewith into the path of movement of said rock-body to lock releasably with the rock-body when the latter is engaged with said swing-arm and to be disengaged therefrom when the swing-arm is disengaged from the rock-body, and a pawl on said rock-body engaging with said push-arm when the rock-body is engaged therewith and with the swing-arm, to prevent retrograde movement of the push-arm while so locked.

Signed at Waterloo, Iowa, this 10th day of May, 1916.

WALTER THEOBALD HAUSER.

Copies of this patent may be obtained for five cents each, by addressing the "Commissioner of Patents, Washington, D. C."